US011632778B2

(12) United States Patent
Sevindik (10) Patent No.: US 11,632,778 B2
(45) Date of Patent: Apr. 18, 2023

(54) UPLINK RESOURCE ALLOCATION IN FIXED WIRELESS ACCESS SYSTEMS USING WIFI CONTROLLER

(71) Applicant: Charter Communications Operating, LLC, St. Louis, MO (US)

(72) Inventor: Volkan Sevindik, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 17/826,300

(22) Filed: May 27, 2022

(65) Prior Publication Data

US 2022/0295523 A1 Sep. 15, 2022

Related U.S. Application Data (62) Division of application No. 17/135,008, filed on Dec. 28, 2020, now Pat. No. 11,375,526.

(51) Int. Cl.
*H04W 72/12* (2023.01)
*H04W 72/04* (2023.01)
*H04W 72/1268* (2023.01)
*H04W 72/23* (2023.01)

(52) U.S. Cl.
CPC ....... *H04W 72/1268* (2013.01); *H04W 72/04* (2013.01); *H04W 72/23* (2023.01)

(58) Field of Classification Search
None
See application file for complete search history.

(56) References Cited

U.S. PATENT DOCUMENTS

| 2009/0075667 | A1* | 3/2009 | Bourlas | H04L 5/0055 455/452.1 |
|---|---|---|---|---|
| 2020/0259896 | A1 | 8/2020 | Sachs et al. | |
| 2021/0037482 | A1 | 2/2021 | Shin et al. | |
| 2022/0183047 | A1* | 6/2022 | Sevindik | H04W 16/02 |
| 2022/0210819 | A1* | 6/2022 | Sevindik | H04W 52/0274 |

FOREIGN PATENT DOCUMENTS

| WO | 2019133048 A1 | 7/2019 |
|---|---|---|
| WO | 2022011033 A1 | 1/2022 |

\* cited by examiner

*Primary Examiner* — Kenny S Lin
(74) *Attorney, Agent, or Firm* — Young Basile Hanlon & MacFarlane, P.C.

(57) ABSTRACT

Uplink resource allocation in fixed wireless access (FWA) networks using wireless controllers is described. The method includes allocating shared spectrum to a Citizens Broadband Radio Service (CBRS) device (CBSD), wirelessly connecting customer premises equipment (CPE) of a FWA network to the CBSD, receiving scheduling requests (SRs) from the CPE, transmitting a grant with allocated uplink resources to the CPE, sending CBSD information, CPE information, and allocated uplink resource information to a wireless controller, transmitting to the CPE a message to use previously allocated uplink resources until a defined event when the CBSD lacks downlink transmission capability, sending instructions to the wireless controller to start monitoring uplink communication channels while the CBSD lacks the downlink transmission capability, sending a request to the CBSD to assign additional uplink resources when determining an increase in uplink communications, and transmitting a grant to the CPE for the additional uplink resources.

20 Claims, 5 Drawing Sheets

UPLINK RESOURCE ALLOCATION IN FIXED WIRELESS ACCESS SYSTEMS USING WIFI CONTROLLER

CROSS REFERENCE TO RELATED APPLICATION

This application is a divisional of U.S. patent application Ser. No. 17/135,008, filed on Dec. 28, 2020, of which is incorporated herein by reference.

TECHNICAL FIELD

This disclosure relates to wireless communications. More specifically, this disclosure relates to uplink resource allocation in a fixed wireless access system.

BACKGROUND

Fixed Wireless Access (FWA) networks and systems provide wireless internet access to homes or businesses (collectively "premises") without having to lay fiber and cables to provide last mile connectivity, which can be cost prohibitive. For example, FWA enables network operators to provide ultra-high-speed broadband to suburban and rural areas. Customer premises equipment (CPE) is connected to a base station, such as a Citizens Broadband Radio Service (CBRS) device (CBSD), using a wireless channel. The CPE is connected to a wireless or Wifi (collectively "wireless") router via a cable connection. The wireless router serves wireless users in the premises. Consequently, there is a high probability that there will always be downlink and uplink traffic since at least one wireless user will be active at any given time.

The wireless channel includes uplink and downlink communication channels or links to communicate data between two or more devices. The uplink communication channel generally refers to communications from a user device toward the base station. The downlink communication channel generally refers to communications from the base station towards the user device. CPEs request uplink resources by sending Scheduling Requests (SR) to the CBSD. For example, when the CPE wants to send uplink data, the CPE first sends a SR to the CBSD. A packet scheduler in the CBSD assigns the uplink resources for the requesting CPE and sends the location of these resources, for example, physical uplink shared channel (PUSCH) resources, to the CPE. The CPE transmits uplink data using these uplink resources.

In the event the base station is unable to communicate with the CPE on the downlink channel, the CPE will be unable to receive grant information. For example, CBSDs are allocated shared spectrum from a spectrum access system (SAS). The shared spectrum is interference based and can be unallocated by the SAS at any time. In this instance, the CPE's uplink coverage does not change since the CPE's uplink power does not change. Therefore, the network now has a shrunken downlink coverage with same uplink coverage. This translates into a situation where the CPE can still send SRs in the uplink but the CBSD is unable to send grants to the CPE in the downlink.

SUMMARY

Disclosed herein are methods and systems for uplink resource allocation in fixed wireless access networks using wireless controllers. In implementations, a method for uplink resource allocation in fixed wireless access networks using wireless controllers includes allocating, by a spectrum access system (SAS) to a Citizens Broadband Radio Service (CBRS) device (CBSD), shared spectrum for uplink and downlink channel communication, wirelessly connecting to the CBSD by a customer premises equipment (CPE) of a fixed wireless access (FWA) network, receiving, by the CBSD from the CPE, scheduling requests (SRs) to obtain uplink resources, transmitting, by the CBSD to the CPE, a grant with allocated uplink resources, sending, by the CBSD to a wireless controller, CBSD information, CPE information, and allocated uplink resource information, transmitting, by the CBSD to the CPE, a message to use previously allocated uplink resources until a defined event when the CBSD lacks downlink transmission capability, sending, by the CBSD to the wireless controller, instructions to start monitoring uplink communication channels while the CBSD lacks the downlink transmission capability, sending, by the wireless controller to the CBSD, a request to assign additional uplink resources when determining an increase in uplink communications, and transmitting, by the CBSD to the CPE, a grant for the additional uplink resources.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Disclosed herein are methods and systems for uplink resource allocation in fixed wireless access networks using wireless controllers. In implementations, fixed wireless access (FWA) networks include a customer premises equipment (CPE) connected to wireless routers managed by a wireless controller. The CPE is wirelessly connected to a base station, which in turn is connected to the wireless controller. In the instance that the base station loses downlink capabilities, the wireless controller monitors the uplink channel traffic. In implementations, the wireless controller monitors scheduling requests (SR) being sent by the CPE. In implementations, the wireless controller monitors frequency of scheduling requests (SR) being sent by the CPE. In implementations, the wireless controller monitors whether there is an increase in the amount of uplink data being transmitted by the CPE. In the event of increasing uplink channel traffic, the wireless controller informs the base station to send additional uplink resources to the CPE. The base station temporarily powers on to transmit a grant with additional uplink resources to the CPE.

In implementations, the base station notifies the wireless controller to initiate monitoring of the uplink channel communications. The base station shares information with the wireless controller including base station identification and connected CPE identifications. In implementations, the wireless controller maintains a look-up table with regard to each connected base stations and the CPEs connected to each of the connected base stations. For example, the table includes base station identifier, CPE identifiers, and like information.

In implementations, when the base station loses downlink capabilities, the base station informs the CPE to maintain using the granted uplink resources for a fixed period. In implementations, when the base station loses downlink capabilities, the base station informs the CPE to maintain using the granted uplink resources until the base station sends another grant with uplink resources.

In implementations, the base station is a Citizens Broadband Radio Service (CBRS) device (CBSD) which uses shared spectrum as allocated by a spectrum access system (SAS). In the event that the SAS deallocates the allocated shared spectrum, the CBSD works with the wireless controller to maintain the FWA network as described herein.

Figure 1:
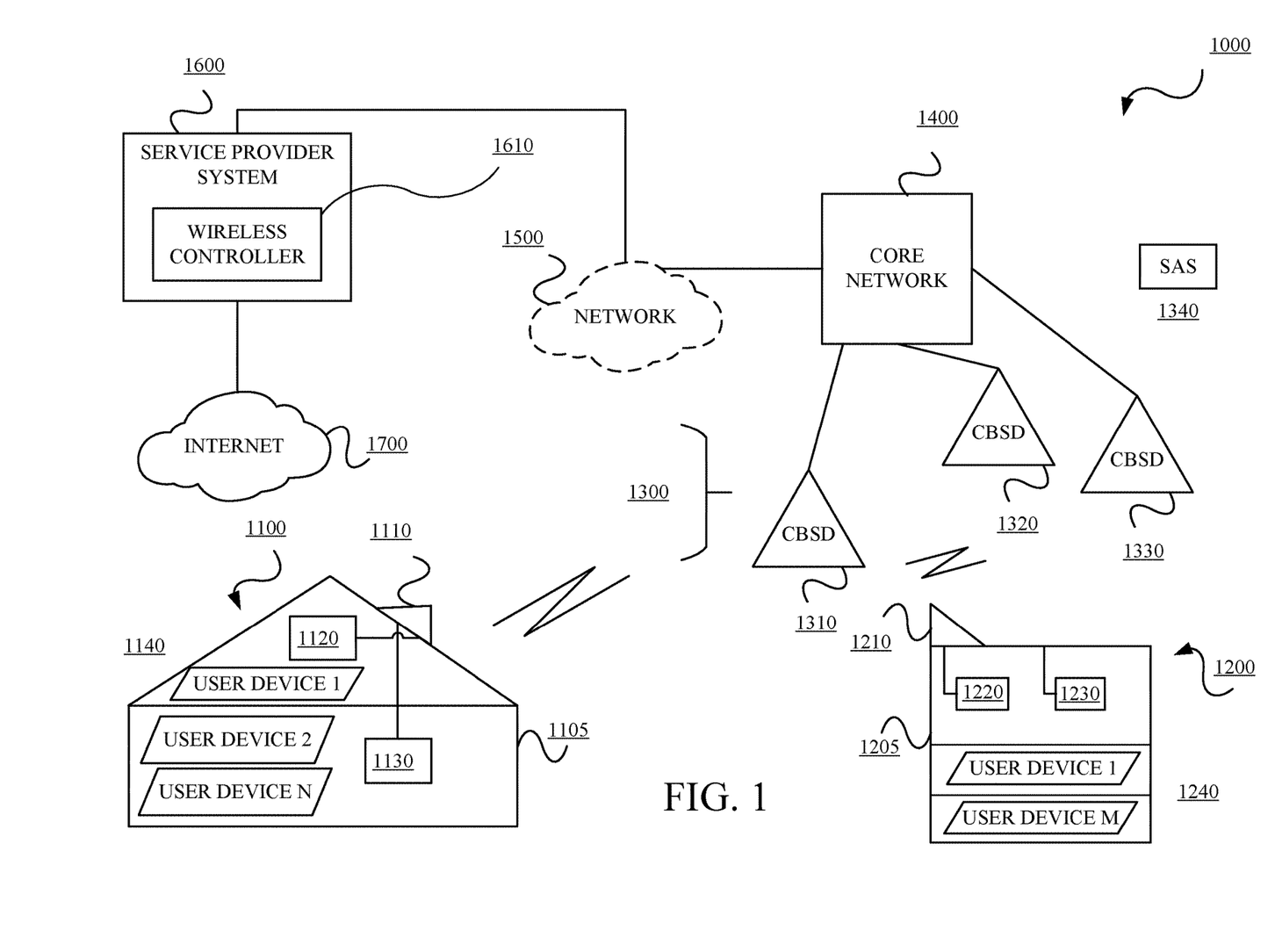
FIG. 1 is a diagram of an example of a telecommunications network in accordance with embodiments of this disclosure.

FIG. 1 is a diagram of an example of an architecture and/or telecommunications system 1000 in accordance with embodiments of this disclosure. In implementations, the architecture 1000 can include a FWA network 1100, a FWA network 1200, and a Citizens Broadband Radio Service (CBRS) or shared spectrum network 1300 (collectively "shared spectrum network"). The shared spectrum network is an example wireless communication system and other wireless communication systems, such as a 4G licensed spectrum network and/or a 5G licensed spectrum network, can be used without departing from the scope of the specifications or claims. The FWA network 1100 and the FWA network 1200 are wirelessly connected to or in communication with (collectively "connected to") the shared spectrum network as described herein. The architecture 1000 is illustrative and may include additional, fewer or different devices, entities and the like which may be similarly or differently architected without departing from the scope of the specification and claims herein. Moreover, the illustrated devices may perform other functions without departing from the scope of the specification and claims herein.

In implementations, the FWA network 1100 can be implemented at a premises 1105. In implementations, the FWA network 1100 can include a CPE 1110 connected to wireless routers 1120 and 1130. In implementations, the connections between the CPE 1110 and the wireless routers 1120 and 1130 are wired connections. The wireless routers 1120 and 1130 provide wireless and/or wired network coverage to user devices 1140 such as user device 1, as user device 2, . . . , user device N. In implementations, the wireless routers 1120 and 1130 are WiFi® routers. In implementations, the number of wireless routers is illustrative and the architecture 1000 can include more or less wireless routers. The wireless routers 1120 and 1130 can be connected to a wireless controller 1610 provisioned in a service provider system 1600.

The wireless controller 1610 can manage, configure, and control the wireless routers 1120 and 1130 to provide access to the FWA network 1100, for example. The wireless controller 1610 can monitor uplink traffic to connected CBSDs as described herein. In implementations, the wireless controller 1610 can maintain a look-up table with connected CBSDs, CPEs connected to each CBSD, and uplink resource information.

The CPE 1110 can request uplink resources from a CBSD based on the amount of uplink traffic. The CPE 1110 can send, for example, scheduling requests (SRs) to the CBSD to request uplink resources. The CPE 1110 can receive locations of the uplink resources and can use these uplink resources to transmit the uplink data.

In implementations, the FWA network 1200 can be implemented at a premises 1205. In implementations, the FWA network 1200 can include a CPE 1210 connected to wireless routers 1220 and 1230. In implementations, the connections between the CPE 1210 and the wireless routers 1220 and 1230 are wired connections. The wireless routers 1220 and 1230 provide wireless and/or wired network coverage to user devices 1240 such as user device 1, . . . , user device M. In implementations, the wireless routers 1220 and 1230 are WiFi® routers. In implementations, the number of wireless routers is illustrative and the architecture 1000 can include more or less wireless routers. The wireless routers 1220 and 1230 can be connected to a wireless controller 1610 provisioned in a service provider system 1600.

The wireless controller 1610 can manage, configure, and control the wireless routers 1220 and 1230 to provide access to the FWA network 1200, for example. The wireless controller 1610 can monitor uplink traffic to connected CBSDs as described herein. In implementations, the wireless controller 1610 can maintain a look-up table with connected CBSDs, CPEs connected to each CBSD, and uplink resource information.

The CPE 1210 can request uplink resources from a CBSD based on the amount of uplink traffic. The CPE 1210 can send, for example, scheduling requests (SRs) to the CBSD to request uplink resources. The CPE 1210 can receive locations of the uplink resources and can use these uplink resources to transmit the uplink data.

In implementations, the CBRS network 1300 can include CBRS devices (CBSDs) 1310, 1320, and 1330. The architecture 1000 can include a SAS 1340 which is in communication with each of the CBSDs 1310, 1320, and 1330 as described herein. The CBRS spectrum is a type of shared spectrum, license-by-rule spectrum, or lightly licensed spectrum which is shared between multiple entities including government users (such as the military), licensed users, and non-licensed users. For example, shared spectrum may be used for fixed wireless access networks. CBRS is a multi-tiered wireless band between 3.550 MHz and 3.700 MHz. In particular, CBRS is a three-tiered access framework including incumbent users (i.e., federal, military, and the like), priority access license (PAL) users (winning auction bidders), and general authorized access (GAA) users, where the GAA users are permitted to use any portion of the CBRS spectrum not assigned to a higher tier user and may also operate opportunistically on unused priority access spectrum. Availability of CBRS spectrum dynamically changes depending on use by higher priority entities. Higher tier users are protected from lower tier users using the centralized SAS 1340, which may be a federal or commercial entity. The SAS 1340 authorizes or grants spectrum to CBSDs and performs interference management to protect higher tier users. This protection may include, for example, dropping CBSDs which are GAA users. In summary, CBRS is an interference limited network which means that the performance of the network and the data sent to CBRS subscribers is limited by the amount of interference the CBRS users or subscribers experience in the frequency band of operation.

The user devices 1140 and 1240 can be, but is not limited to, a dual SIM device, end user devices, cellular telephones, Internet Protocol (IP) devices, mobile computers, laptops, handheld computers, personal media devices, smartphones, notebooks, notepads, and the like which can access and operate with the FWA network 1100, the FWA network 1200, the shared spectrum network 1300, and the like, as appropriate and applicable.

The CBSDs 1310, 1320, and 1330 can be a base station, an access point, an access node, or like device which enables radio communications access between, for example, the CPE 1110 and the CPE 1210 and the user devices connected thereto with other devices and/or the Internet 1700, for example. In implementations, the number of CBSDs is illustrative and the architecture 1000 can include more or less CBSDs. The CBSDs 1310, 1320, and 1330 can connect to the wireless controller 1610 via a core network 1400 and as applicable, a network 1500. The core network 1400 can provide interconnection and associate services between multiple telecommunications systems including wireless and wired communication systems. The network 1500 can include wired networks, wireless network, and/or combinations thereof.

Figure 2:
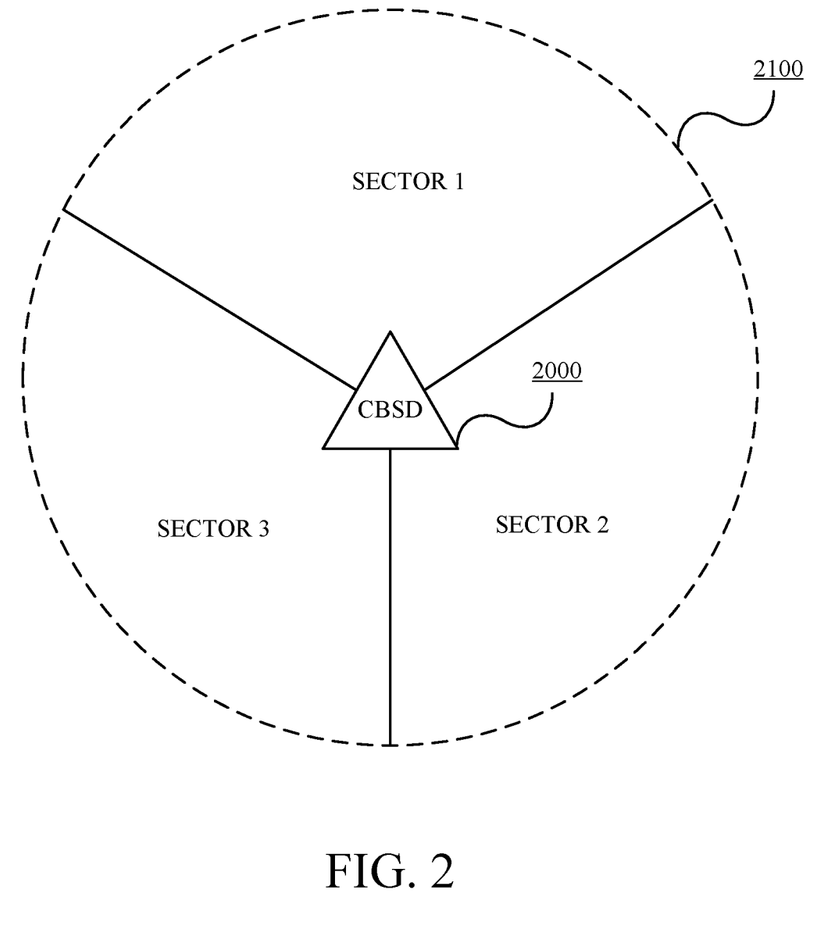
FIG. 2 is a diagram of an example sector coverage in accordance with embodiments of this disclosure.

Each CBSD 1310, 1320, and 1330 can be authorized and granted spectrum allocation by the SAS 1340. Each CBSD 1310, 1320, and 1330 can have one or more sectors which provide wireless communications coverage. FIG. 2 is a diagram of an example CBSD 2000 with sector coverage 2100 in accordance with embodiments of this disclosure. The sector coverage 2100 can include, for example, sector 1, sector 2, and sector 3. Each CBSD can receive a SR from a connected CPE. The CBSD can then allocate uplink resources and transmit a grant indicating the location of the allocated uplink resources. The CBSDs are an illustrative example and other base stations can be used without departing from the scope of the specification and claims herein.

The communications between the user devices 1140 and 1240, the CPE 1110, the CPE 1210, CBSDs 1310, 1320, and 1330, the core network 1400, the network 1500, the service provider system 1600, and the wireless controller 1610, can include wired communications, wireless communications, or combinations thereof, as appropriate and applicable. In an implementation, the architecture 1000 may execute the techniques described in FIG. 4 and FIG. 5.

Operationally, the CBSDs 1310, 1320, and 1330 can be granted spectrum by the SAS 1340. In an illustrative example, the CBSD 1310 can be connected to the CPE 1110 in the FWA network 1100 and to the CPE 1210 in the FWA network 1200. CPEs such as the CPE 1110 and CPE 1210 send SRs to the CBSD 1310 for uplink resources. The CBSD 1310 allocates the requested uplink resources and transmits a grant to the requesting CPEs. The SAS 1340 deallocates the spectrum granted to the CBSD 1310. Consequently, CBSD 1310 will be unable to send downlink transmissions. Prior to being unable to send downlink transmissions, the CBSD 1310 informs the CPEs to use the currently allocated uplink resources until a defined event. In implementations, the defined event can be a time period, sending of another grant, and the like. The CBSD 1310 also informs the wireless controllers such as a wireless controller 1610 to monitor uplink channel communications or traffic from connected CPEs such as the CPE 1110 and CPE 1210. In implementations, the wireless controller 1610 maintains a table of CBSDs, connected CPEs, uplink resource information, and the like. The wireless controller 1610 informs the CBSD 1310 in the instance that the uplink channel communications is increasing and additional uplink resources are needed. The CBSD 1310 can power up temporarily and transmit a grant to the CPE needing additional uplink resources. In implementations, the CBSD 1310 can transmit using one sector to minimize interference.

Figure 3:
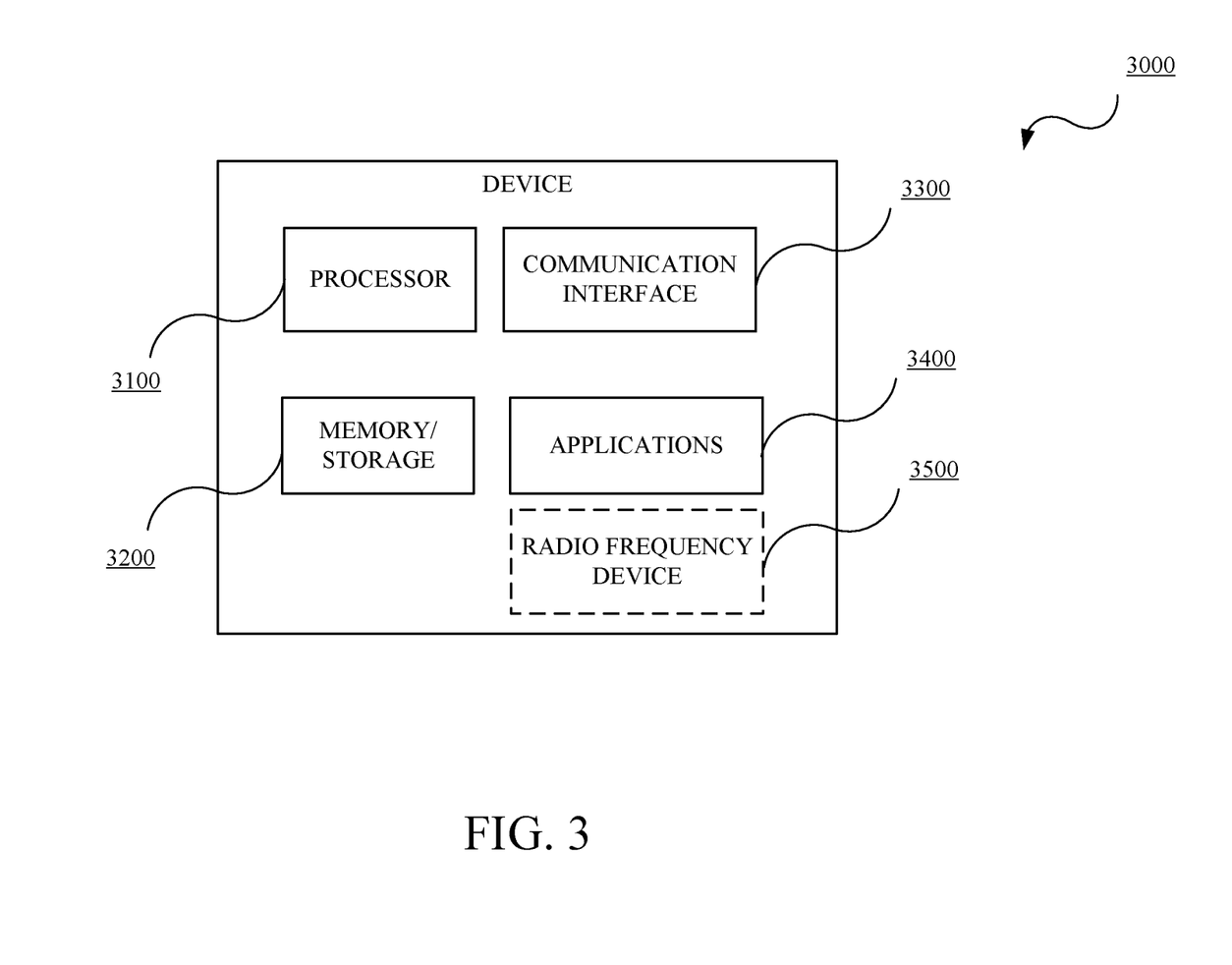
FIG. 3 is a block diagram of an example device in accordance with embodiments of this disclosure.

FIG. 3 is a block diagram of an example of a device 3000 in accordance with embodiments of this disclosure. The device 3000 may include, but is not limited to, a processor 3100, a memory/storage 3200, a communication interface 3300, and applications 3400. In an implementation, the device 3000 can include a radio frequency device 3500. The device 3000 can include or implement, for example, the user devices or terminals 1140 and 1240, the CBSDs 1310, 1320, and 1330, the core network 1400, the CPEs 1120 and 1210, the wireless controller 1610, and the service provider system 1600. In an implementation, the memory/storage 3200 may store the uplink resources, the wireless control table for CBSDs and CPEs, and other information. The applicable or appropriate techniques or methods as described herein may be stored in the memory/storage 3200 and executed by the processor 3100 in cooperation with the memory/storage 3200, the communications interface 3300, the applications 3400, and the radio frequency device 3500 (when applicable) as appropriate. The device 3000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 4:
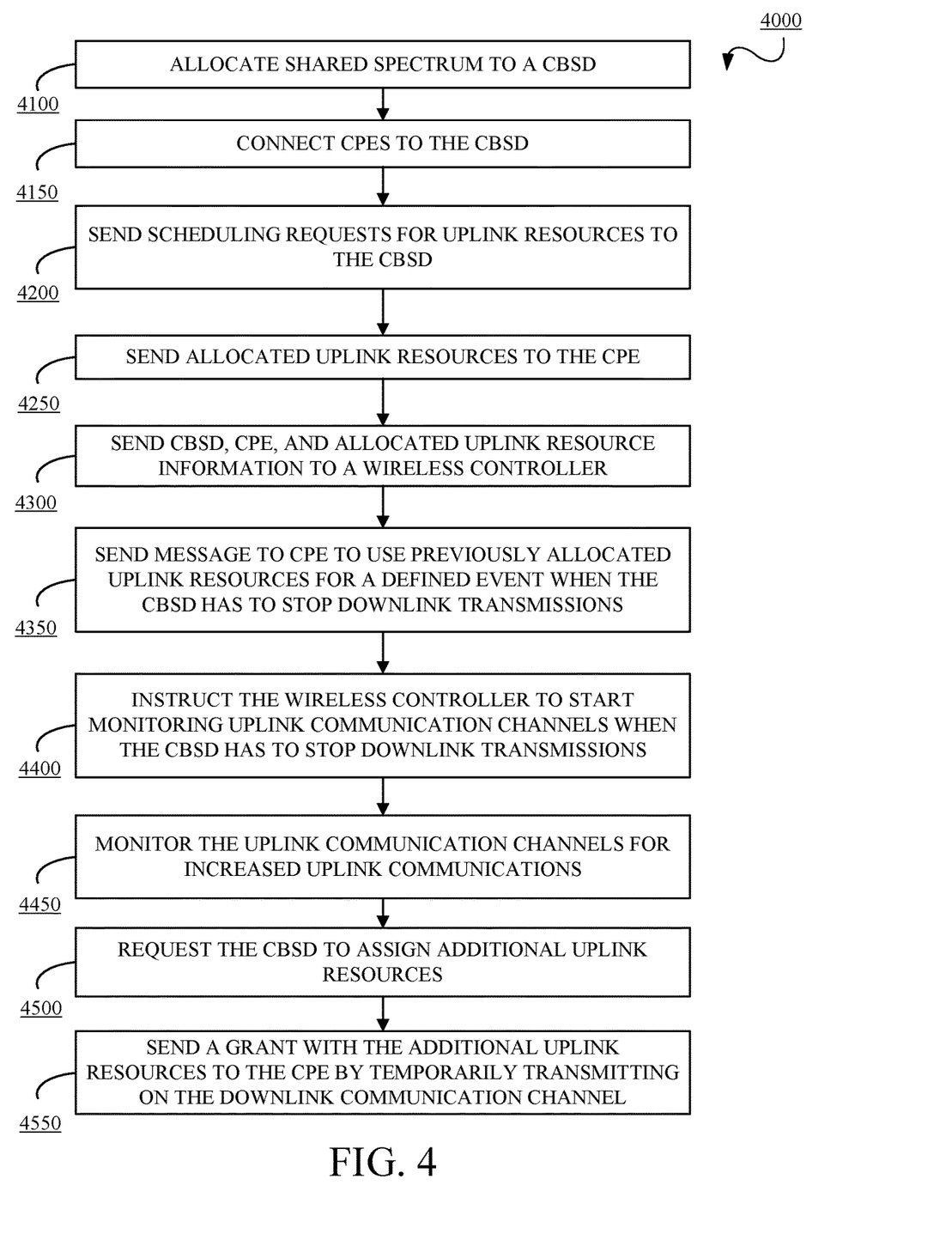
FIG. 4 is a flowchart of an example method for uplink resource allocation in fixed wireless access networks using wireless controllers in accordance with embodiments of this disclosure.

FIG. 4 is a flowchart of an example method 4000 for uplink resource allocation in fixed wireless access networks using wireless controllers in accordance with embodiments of this disclosure. The method 4000 includes: allocating 4100 shared spectrum to a CBSD;

connecting 4150 CPEs to the CBSD; sending 4200 scheduling requests for uplink resources to the CBSD; sending 4250 allocated uplink resources to the CPE; sending 4300 CBSD, CPE, and allocated uplink resource information to a wireless controller; sending 4350 message to CPE to use previously allocated uplink resources until a defined event when the CBSD has to stop downlink transmissions; instructing 4400 the wireless controller to start monitoring uplink communication channels while the CBSD is prevented from making downlink transmissions; monitoring 4450 the uplink communication channels for increased uplink communications; requesting 4500 the CBSD to assign additional uplink resources when determining an increase in uplink communications; and sending 4550 a grant with the additional uplink resources to the CPE by temporarily transmitting on the downlink communication channel. For example, the method 4000 may be implemented, as applicable and appropriate, by the user devices or terminals 1140 and 1240, the CBSDs 1310, 1320, and 1330, the core network 1400, the CPEs 1120 and 1210, the wireless controller 1610, the service provider system 1600, the device 3000, the processor 3100, the memory/storage 3200, the communication interface 3300, and the applications 3400.

The method 4000 includes allocating 4100 shared spectrum to a CBSD. CBSDs register with a SAS. The SAS grants shared spectrum to the CBSDs. The CBSDs can communicate with devices using uplink communication channel and downlink communication channel.

The method 4000 includes connecting 4150 CPEs to the CBSD. A premise includes a CPE and one or more wireless routers connected to the CPE to establish a FWA network. The CPE connects to the CBSD. The CBSD transmits data to the CPE using the downlink communication channel.

The method 4000 includes sending 4200 scheduling requests (SRs) for uplink resources to the CBSD. The CPE determines the amount of uplink resources needed based on uplink data demand of user devices attached to the wireless routers. The CPE sends a SR to the CBSD indicating the amount of uplink resources needed.

The method 4000 includes sending 4250 allocated uplink resources to the CPE. The CBSD receives the SR and allocates uplink resources in the shared spectrum to the CPE. The CBSD transmits a grant which indicates the locations or positions of the allocated uplink resources.

The method 4000 includes sending 4300 CBSD, CPE, and allocated uplink resource information to a wireless controller. The CBSD sends the CBSD identification, CPE identification, and the allocated uplink resource to the wireless controller managing the wireless routers in the FWA network.

The method 4000 includes sending 4350 message to the CPE to use previously allocated uplink resources until a defined event when the CBSD has to stop downlink transmissions. The SAS deallocates the shared spectrum to the CBSD due to, for example, interference or priority based reasons. The CBSD sends a message to the CPE to use the current uplink resource allocations until a defined event occurs, which can be for example, expiration of a time period, receipt of another uplink resource allocation, and the like.

The method 4000 includes instructing 4400 the wireless controller to start monitoring uplink communication channels while the CBSD is prevented from making downlink transmissions. The CBSD also instructs the wireless controller to monitor transmissions from the CPE.

The method 4000 includes monitoring 4450 the uplink communication channels for increased uplink communications. The wireless controller can monitor SRs sent by the CPE, frequency of SRs sent by the CPE, changes in amount of data being transmitted, and the like.

The method 4000 includes requesting 4500 the CBSD to assign additional uplink resources when determining an increase in uplink communications. If the wireless controller determines an increase in the uplink communications, a request is sent to the CBSD to assign more uplink resources. In implementations, an increase is determined when the uplink communications steadily or consistently increases.

The method 4000 includes sending 4550 a grant with the additional uplink resources to the CPE by temporarily transmitting on the downlink communication channel. The CBSD can turn on temporarily to send a grant to the CPE. In implementations, the CBSD can send the grant on one sector to minimize interference.

Figure 5:
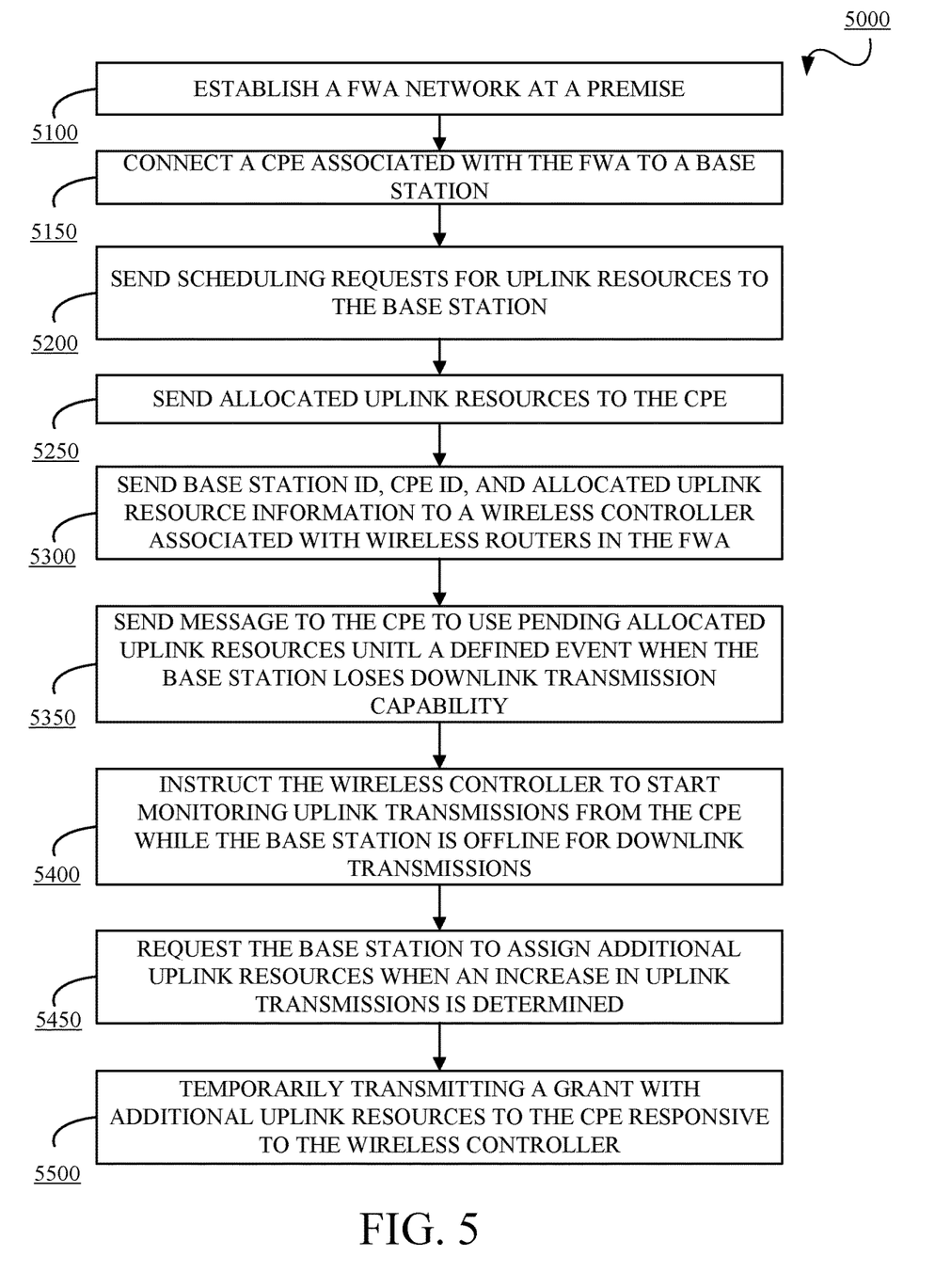
FIG. 5 is a flowchart of an example method for uplink resource allocation in fixed wireless access networks using wireless controllers in accordance with embodiments of this disclosure.

FIG. 5 is a flowchart of an example method 5000 for uplink resource allocation in fixed wireless access networks using wireless controllers in accordance with embodiments of this disclosure. The method 5000 includes: establishing 5100 a FWA network at a premise; connecting 5150 a CPE associated with the FWA to a base station; sending 5200 scheduling requests for uplink resources to the base station; sending 5250 allocated uplink resources to the CPE; sending 5300 base station identifier, CPE identifier, and allocated uplink resource information to a wireless controller associated with wireless routers in the FWA; sending 5350 a message to the CPE to use pending allocated uplink resources until a defined event when the base station loses downlink transmission capability; instructing 5400 the wireless controller to start monitoring uplink transmissions from the CPE while the base station is offline for downlink transmissions; requesting 5450 the base station to assign additional uplink resources when an increase in uplink transmissions is determined; and temporarily transmitting 5500 a grant with additional uplink resources to the CPE responsive to the wireless controller. For example, the method 5000 may be implemented, as applicable and appropriate, by the user devices or terminals 1140 and 1240, the CBSDs 1310, 1320, and 1330, the core network 1400, the CPEs 1120 and 1210, the wireless controller 1610, the service provider system 1600, the device 3000, the processor 3100, the memory/storage 3200, the communication interface 3300, and the applications 3400.

The method 5000 includes establishing 5100 a FWA network at a premise. A FWA is set-up at a premise. The FWA includes a CPE and one or more wireless routers connected to the CPE.

The method 5000 includes connecting 5150 a CPE associated with the FWA to a base station. Communication services are provided by having the CPE connect to a base station which provides wireless communication coverage. The base station initiates communications by sending messages on the downlink channel.

The method 5000 includes sending 5200 scheduling requests for uplink resources to the base station. The CPE, based on user device data transmission demands, sends a SR to the base station to obtain uplink communication resources.

The method 5000 includes sending 5250 allocated uplink resources to the CPE. The base station, responsive to the SR, transmits a grant to the CPE which indicates a location of the allocated uplink communication resources.

The method 5000 includes sending 5300 base station identifier, CPE identifier, and allocated uplink resource information to a wireless controller associated with wireless routers in the FWA. The base station sends the grant, base station ID, and CPE ID to the wireless controller. The wireless controller maintains a table of base station IDs, CPE IDs, and grant information.

The method 5000 includes sending 5350 a message to the CPE to use pending allocated uplink resources until a defined event when the base station loses downlink transmission capability. The base station can lose the ability to transmit on the downlink channel for a variety of reasons. In this case, the base station notifies the CPE to keep using the already allocated uplink communication resources to transmit uplink data until the occurrence of the defined event. The defined event can be expiration of a time interval, receipt of a new uplink communication resource allocation, and the like.

The method 5000 includes instructing 5400 the wireless controller to start monitoring uplink transmissions from the CPE while the base station is offline for downlink transmissions. Since the base station is unable is going to be offline or off, the base station instructs the wireless monitor the uplink transmission.

The method 5000 includes requesting 5450 the base station to assign additional uplink resources when an increase in uplink transmissions is determined. The wireless controller can monitor SRs sent by the CPE, frequency of SRs sent by the CPE, changes in amount of data being transmitted, and the like. If the wireless controller determines an increase in the uplink communications, a request is sent to the base station to assign more uplink resources. In implementations, an increase is determined when the uplink transmissions steadily or consistently increases.

The method 5000 includes temporarily transmitting 5500 a grant with additional uplink resources to the CPE responsive to the wireless controller. The base station can turn on temporarily to send a grant to the CPE. In implementations, the base station can send the grant on one sector to minimize interference.

In general, a method for uplink resource allocation in fixed wireless access networks using wireless controllers includes allocating, by a spectrum access system (SAS) to a Citizens Broadband Radio Service (CBRS) device (CBSD), shared spectrum for uplink and downlink channel communication, wirelessly connecting to the CBSD by a customer premises equipment (CPE) of a fixed wireless access (FWA) network, receiving, by the CBSD from the CPE, scheduling requests (SRs) to obtain uplink resources, transmitting, by the CBSD to the CPE, a grant with allocated uplink resources, sending, by the CBSD to a wireless controller, CBSD information, CPE information, and allocated uplink resource information, transmitting, by the CBSD to the CPE, a message to use previously allocated uplink resources until a defined event when the CBSD lacks downlink transmission capability, sending, by the CBSD to the wireless controller, instructions to start monitoring uplink communication channels while the CBSD lacks the downlink transmission capability, sending, by the wireless controller to the CBSD, a request to assign additional uplink resources when determining an increase in uplink communications, and transmitting, by the CBSD to the CPE, a grant for the additional uplink resources.

In implementations, the method includes monitoring, by the wireless controller, the uplink communication channels for frequency of SRs being sent by the CPE to determine the increase in uplink communications. In implementations, the method includes monitoring, by the wireless controller, the uplink communication channels for uplink data being sent by the CPE to determine the increase in uplink communications. In implementations, the method includes monitoring, by the wireless controller, the uplink communication channels for SRs being sent by the CPE to determine the increase in uplink communications. In implementations, the defined event is another grant from the CBSD. In implementations, the defined event is expiration of a time period. In implementations, the method includes deallocating, by the SAS, the shared spectrum from the CBSD. In implementations, the wireless controller is associated with wireless routers in the FWA. In implementations, the method includes the wireless controller maintains a table for the each received CBSD information, CPE information, and allocated uplink resource information. In implementations, the transmitting the message and the sending of the instructions is done prior to loss of downlink transmission capability.

In general, a method for uplink resource allocation in fixed wireless access networks using wireless controllers includes establishing, by a base station, a connection with a customer premises equipment (CPE), wherein the CPE is connected to one or more wireless routers to form a fixed wireless access (FWA) network at a premise, receiving, by the base station from the CPE, scheduling requests to obtain uplink resources, sending, by the base station to the base station, allocated uplink resources, sending, by the base station to a wireless controller controlling the one or more wireless controllers, a base station identifier, a CPE identifier, and allocated uplink resource information, sending, by the base station to the CPE, instructions to use currently allocated uplink resources when the base station is powered off: instructing the wireless controller to start monitoring uplink transmissions from the CPE while the base station is off; and temporarily transmitting, by the base station, a grant with additional uplink resources to the CPE responsive to a request from the wireless controller.

In implementations, the method includes requesting, by the wireless controller, to assign additional uplink resources when an increase in uplink transmissions is determined. In implementations, the increase in uplink transmissions is determined by monitoring scheduling requests being sent by the CPE. In implementations, the increase in uplink transmissions is determined by monitoring amount of uplink data being sent by the CPE. In implementations, the CPE stops using the currently allocated uplink resources when the CPE receives a new grant from the base station.

In general, a system includes a fixed wireless access (FWA) network including a plurality of wireless routers connected to a customer premises equipment (CPE), a wireless controller configured to manage the plurality of wireless routers and monitor uplink transmissions from the CPE, and a base station connected to the CPE and the wireless controller. The base station configured to receive scheduling requests to obtain uplink transmission resources, send resource allocation grants to the CPE responsive to the scheduling requests, send base station information, CPE information, and allocated uplink resource information to the wireless controller, and when the base station is instructed to be off: send instructions to the CPE to maintain using allocated uplink resources, send instructions to the wireless controller to start monitoring the uplink transmissions from the CPE, and send resource allocation grants to the CPE responsive to the wireless controller.

In implementations, the wireless controller determines an increase in uplink transmissions from the CPE by monitoring scheduling requests from the CPE. In implementations, the wireless controller determines an increase in uplink transmissions from the CPE by monitoring frequency of scheduling requests from the CPE. In implementations, the wireless controller determines an increase in uplink transmissions from the CPE by monitoring data amounts in the transmissions from the CPE. In implementations, the CPE stops using the currently the allocated uplink resources when the CPE receives a new grant from the base station.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for uplink resource allocation in fixed wireless access networks using wireless controllers, the method comprising:
    establishing, with a base station, a connection by a customer premises equipment (CPE), wherein the CPE is connected to one or more wireless routers to form a fixed wireless access (FWA) network at a premise;
    sending, by the base station to the CPE, allocated uplink resources responsive to CPE scheduling requests;
    sending, by the base station to a wireless controller, a base station identifier, a CPE identifier, and allocated uplink resource information, the wireless controller controlling the one or more wireless routers;
    sending, by the base station to the CPE, instructions to use currently allocated uplink resources when the base station is to be powered off;
    instructing the wireless controller to start monitoring uplink transmissions from the CPE when the base station is to be powered off; and
    temporarily turning on and transmitting, by the base station, a grant with additional uplink resources to the CPE responsive to a request from the wireless controller.

2. The method of claim 1, further comprising:
    requesting, by the wireless controller, assignment of additional uplink resources when an increase in uplink transmissions is determined.

3. The method of claim 2, wherein the increase in uplink transmissions is determined by monitoring scheduling requests being sent by the CPE.

4. The method of claim 2, wherein the increase in uplink transmissions is determined by monitoring amount of uplink data being sent by the CPE.

5. The method of claim 2, wherein the increase in uplink transmissions is determined by monitoring frequency of scheduling requests being sent by the CPE.

6. The method of claim 1, wherein the CPE stops using currently allocated uplink resources when the CPE receives a new grant from the base station.

7. The method of claim 1, wherein the CPE stops using currently allocated uplink resources upon expiration of a timer.

8. The method of claim 1, wherein the sending the instructions and the instructing are done prior to the base station being powered off.

9. A system comprising:
    a fixed wireless access (FWA) network including a plurality of wireless routers connected to a customer premises equipment (CPE);
    a wireless controller configured to manage the plurality of wireless routers and monitor uplink transmissions from the CPE, and a base station connected to the CPE, the base station configured to:
- receive scheduling requests to obtain uplink transmission resources;
- send resource allocation grants to the CPE responsive to the scheduling requests;
- send base station information, CPE information, and allocated uplink resource information to the wireless controller; and when the base station is instructed to be off:
- prior to turning off, send instructions to the CPE to maintain use of allocated uplink resources;
- prior to turning off, communicate instructions to the wireless controller to start monitoring the uplink transmissions from the CPE; and
- after turning on temporarily when turned off, send resource allocation grants to the CPE responsive to the wireless controller.

10. The system of claim 9, wherein the wireless controller determines an increase in the uplink transmissions from the CPE by monitoring scheduling requests from the CPE.

11. The system of claim 9, wherein the wireless controller determines an increase in the uplink transmissions from the CPE by monitoring frequency of scheduling requests from the CPE.

12. The system of claim 9, wherein the wireless controller determines an increase in uplink transmissions from the CPE by monitoring data amounts in the transmissions from the CPE.

13. The system of claim 9, wherein the CPE stops using currently allocated uplink resources when the CPE receives a new resource allocation grant from the base station.

14. The system of claim 9, wherein the CPE stops using currently allocated uplink resources upon expiration of a timer.

15. The system of claim 9, wherein the wireless controller requests an assignment of additional uplink resources when an increase in uplink transmissions is determined.

16. A system comprising:
- one or more wireless routers connected to a customer premises equipment (CPE);
- a wireless controller configured to manage the one or more wireless routers; and
- a base station connected to the CPE, the base station configured to:
  - send resource allocation grants to the CPE responsive to received scheduling requests;
  - send base station information, CPE information, and allocated uplink resource information to the wireless controller; and when the base station is instructed to be off:
- prior to turning off, send instructions to the CPE to maintain use of allocated uplink resources;
- prior to turning off, communicate instructions to the wireless controller to start monitoring uplink transmissions from the CPE; and
- after turning on temporarily when turned off, send resource allocation grants to the CPE responsive to the wireless controller.

17. The system of claim 16, wherein the wireless controller determines an increase in the uplink transmissions from the CPE by monitoring scheduling requests from the CPE.

18. The system of claim 16, wherein the wireless controller determines an increase in the uplink transmissions from the CPE by monitoring data amounts in the transmissions from the CPE.

19. The system of claim 16, wherein the CPE stops using currently allocated uplink resources when the CPE receives a new resource allocation grant from the base station.

20. The system of claim 16, wherein the CPE stops using currently allocated uplink resources upon expiration of a timer.

* * * * *